US006473055B2

(12) United States Patent  (10) Patent No.: US 6,473,055 B2
Kohno et al.                (45) Date of Patent:      Oct. 29, 2002

(54) DIRECTIONAL ANTENNA APPARATUS AND MOBILE COMMUNICATION SYSTEM USING THE SAME

(75) Inventors: Ryuji Kohno, 1202-9, Hazawa-cho, Kanagawa-ku, Yokohama-shi, Kanagawa (JP); Tomonori Sugiyama, Mishima (JP)

(73) Assignees: Toshiba Tec Kabushiki Kaisha, Tokyo (JP); Ryuji Kohno, Yokohama (JP)

( * ) Notice: Subject to any disclaimer, the term of this patent is extended or adjusted under 35 U.S.C. 154(b) by 12 days.

(21) Appl. No.: 09/833,870

(22) Filed: Apr. 12, 2001

(65) Prior Publication Data

US 2001/0052875 A1 Dec. 20, 2001

(30) Foreign Application Priority Data

Apr. 17, 2000 (JP) ........................................ 2000-115301

(51) Int. Cl.[7] .............................................. H01Q 21/00
(52) U.S. Cl. ...................... 343/853; 342/357.1; 342/383
(58) Field of Search ......................... 343/853; 342/373, 342/357.04, 357.1, 380, 383; 455/560, 562

(56) References Cited

U.S. PATENT DOCUMENTS

| 5,870,668 A | * | 2/1999 | Takano et al. | ............... | 455/126 |
| 5,917,446 A | * | 6/1999 | Greenspan | .................. | 342/373 |
| 6,026,304 A | * | 2/2000 | Hilsenrath et al. | .......... | 455/456 |
| 6,049,307 A | | 4/2000 | Lim | | |
| 6,268,824 B1 | * | 7/2001 | Zhodzishky et al. | ... | 342/357.04 |
| 6,311,167 B1 | * | 10/2001 | Davis et al. | .................. | 705/35 |
| 6,252,544 B1 | * | 6/2002 | Hoffberg | ................. | 342/357.1 |

FOREIGN PATENT DOCUMENTS

| JP | 10-145286 | 5/1998 |
| JP | 11-127019 | 5/1999 |

* cited by examiner

*Primary Examiner*—Tho G. Phan
(74) *Attorney, Agent, or Firm*—Frishauf, Holtz, Goodman & Chick, P.C.

(57) ABSTRACT

The directional antenna apparatus of a base station, after sensing the direction of an undesired wave, calculates the optimum amplitude weighting coefficients and optimum phase weighting coefficients for a plurality of directions between the move starting point and move end point of a mobile station and creates a reference table. Then, when receiving a request for communication from the mobile station, the directional antenna apparatus reads weighting coefficients from the reference table, sets them in each antenna element, and points the directivity toward the mobile station, and starts communication. Then, calculating the time when the mobile station arrives at the position corresponding to each direction from the destination of the mobile station and its moving speed, and reads one by one the optimum amplitude and phase weighting coefficients from the reference table, and sets them in each antenna element, and communicates with the mobile station, while tracking the mobile station.

9 Claims, 13 Drawing Sheets

| STEP | 0 | 1 | 2 | 3 | ... | 30 | ... | 78 | 79 | 80 |
|---|---|---|---|---|---|---|---|---|---|---|
| UNDESIRED WAVE/ DESIRED WAVE (°) | -45/-30 | -45/-29 | -45/-28 | -45/-27 | ... | -45/0 | ... | -45/48 | | -45/50 |
| OPTIMUM AMPLITUDE WEIGHTING COEFFICIENT | | | | | | | | | | |
| ELEMENT 1 | 0.4880 | 0.4596 | 0.4347 | | | 0.1984 | | | 0.2348 | 0.2390 |
| ELEMENT 2 | 0.2150 | 0.2097 | 0.2058 | | | 0.3075 | | | 0.2645 | 0.2600 |
| ... | ... | ... | ... | | | ... | | ... | | |
| ELEMENT N | . | . | . | | | . | | . | | |
| OPTIMUM PHASE WEIGHTING COEFFICIENT (°) | | | | | | | | | | |
| ELEMENT 1 | -47.1171 | -44.1212 | -41.1259 | | | -3.9422 | | | -2.7650 | -2.0935 |
| ELEMENT 2 | -129.905 | -124.302 | -118.748 | | | 12.1217 | | | 132.609 | 135.5625 |
| ... | ... | ... | ... | | | ... | | . | | |
| ELEMENT N | . | . | . | | | . | | . | | |

| STEP | 0 | 1 | 2 | ... | 14 | 15 |
|---|---|---|---|---|---|---|
| UNDESIRED WAVE/DESIRED WAVE (°) | -60/-45 | -60/-40 | -60/-35 | | -60/25 | -60/30 |
| OPTIMUM AMPLITUDE WEIGHTING COEFFICIENT | | | | | | |
| ELEMENT 1 | 0.1984 | 0.2142 | 0.2363 | | 0.234 | 0.2139 |
| ELEMENT 2 | 0.3075 | 0.2948 | 0.26891 | | 0.2719 | 0.2951 |
| ... | | | | | | |
| ELEMENT N | . | . | . | | . | . |
| UNDESIRED WAVE/DESIRED WAVE | | | | | | |
| OPTIMUM AMPLITUDE WEIGHTING COEFFICIENT | | | | | | |
| ELEMENT 1 | -3.942° | -10.244° | -9.1562° | | 9.6357° | 10.2048° |
| ELEMENT 2 | 12.121° | 28.2035° | 10.6031° | | 66.1495° | 77.4620° |
| ... | | | | | | |
| ELEMENT N | . | . | . | | . | . |

351b

| STEP | 0 | 1 | ... | 13 | 14 | 15 |
|---|---|---|---|---|---|---|
| UNDESIRED WAVE/DESIRED WAVE (°) | -60/30 | -60/25 | | -60/-35 | -60/-40 | -60/-45 |
| OPTIMUM AMPLITUDE WEIGHTING COEFFICIENT | | | | | | |
| ELEMENT 1 | 0.2139 | 0.234 | | 0.2363 | 0.2142 | 0.1984 |
| ELEMENT 2 | 0.2951 | 0.2719 | | 0.26891 | 0.2948 | 03075 |
| ... | | | | | | |
| ELEMENT N | . | . | | . | . | . |
| UNDESIRED WAVE/DESIRED WAVE | | | | | | |
| OPTIMUM AMPLITUDE WEIGHTING COEFFICIENT | | | | | | |
| ELEMENT 1 | 10.2048° | 9.6357° | | -9.1562° | -10.244° | -3.942° |
| ELEMENT 2 | 77.4620° | 66.1495° | | 40.6031° | 28.2035° | 12.121° |
| ... | | | | | | |
| ELEMENT N | . | . | | . | . | . |

Table 352a:

| MOVING POSITION | P₁ | P₂ | P₃ | ... | P_{N-1} | P_N |
|---|---|---|---|---|---|---|
| OPTIMUM AMPLITUDE WEIGHTING COEFFICIENT | | | | | | |
| ELEMENT 1 | 0.1984 | 0.2239 | 0.2413 | | 0.2221 | 0.2139 |
| ELEMENT 2 | 0.3075 | 0.2891 | 0.2541 | | 0.2879 | 0.2951 |
| ... | . | . | . | | . | . |
| ELEMENT N | . | . | . | | . | . |
| OPTIMUM AMPLITUDE WEIGHTING COEFFICIENT | | | | | | |
| ELEMENT 1 | −3.942° | −12.412° | −8.2907° | | 8.7429° | 10.2048° |
| ELEMENT 2 | 12.121° | 30.5671° | 42.6232° | | 68.5989° | 77.4620° |
| ... | . | . | . | | . | . |
| ELEMENT N | . | . | . | | . | . |

Table 352b:

| MOVING POSITION | P_N | P_{N-1} | ... | P₃ | P₂ | P₁ |
|---|---|---|---|---|---|---|
| OPTIMUM AMPLITUDE WEIGHTING COEFFICIENT | | | | | | |
| ELEMENT 1 | 0.2139 | 0.2221 | | 0.2413 | 0.2239 | 0.1984 |
| ELEMENT 2 | 0.2951 | 0.2879 | | 0.2541 | 0.2891 | 0.3075 |
| ... | . | . | | . | . | . |
| ELEMENT N | | | | | | |
| OPTIMUM AMPLITUDE WEIGHTING COEFFICIENT | | | | | | |
| ELEMENT 1 | 10.2048° | 8.7429° | | −8.2907° | −12.412° | −3.942° |
| ELEMENT 2 | 77.4620° | 68.5989° | | 42.6232° | 30.5671° | 12.121° |
| ... | . | . | | . | . | . |
| ELEMENT N | | | | | | | though
DIRECTIONAL ANTENNA APPARATUS AND MOBILE COMMUNICATION SYSTEM USING THE SAME

CROSS-REFERENCE TO RELATED APPLICATIONS

This application is based upon and claims the benefit of priority from the prior Japanese Patent Application No. 2000-115301, filed Apr. 17, 2000, the entire contents of which are incorporated herein by reference.

BACKGROUND OF THE INVENTION

This invention relates to a mobile communication system which enables radio communication between base stations with directional antenna apparatuses and mobile station and to base stations used for the system.

In this type of mobile communication system, because of effective use of frequency, suppression of the multipath fading, and elimination of cochannel interference waves, directional antennas have been used at base stations in order to point directivity only toward a mobile station.

A mobile communication system of this type disclosed in, for example, Jpn. Pat. Appln. KOKAI Publication No. 10-145286 is composed of a control station 1 and a base station 2 as shown in FIG. 13. The control station 1 includes a modulator 3 and a demodulator 4, both connected to a public telecommunication network, a local oscillator 5, a mixer 6, a circulator, a power feed distributor 7, a variable attenuator, a phase shifter, a wavelength multiplexer 8. The base station 2 includes a wavelength multiplexer 10 connected to an optical fiber 9, a local oscillator 11, an antenna element driver 12, and an antenna element 13. The mobile communication system enables a two-way wireless communication between the base station 2 with an array antenna composed of a plurality of antenna elements and a mobile station. The array antenna acts as a variable directional antenna whose directivity varies according to the electric signal fed to the antenna.

The signal received by the array antenna at the base station 2 from a mobile station is sent to the control station 1. The control station 1 estimates the directions of arrival of the radiowave from the signal received from the mobile station, calculates the electric signal to be fed to the array antenna of the base station 2, and supplies the electric signal to the array antenna. The directivity of the array antenna is varied so as to point toward the position of the mobile station.

The directions of arrival of the radiowave is estimated by a method of causing the beam to scan and sensing the direction from the reception level, or an directions of arrival estimating method, such as MUSIC or ESPRIT. Since the directions of arrival of the radiowave varies constantly as the mobile station moves, the directions of arrival of the radiowave is estimated at suitable intervals of time and the electric signal to be fed to the array antenna of the base station is calculated on the basis of the estimation.

With the mobile communication system disclosed in the above publication, however, the computing process takes time, causing a problem: when a mobile station moves fast, the base station cannot track the mobile station, resulting in a break in the communication.

BRIEF SUMMARY OF THE INVENTION

The object of the present invention is to provide a directional antenna apparatus capable of causing the directivity of a base station to keep reliable track of even a fast moving mobile station and constantly assuring stable radio communication between the base station and the mobile station, a mobile communication system using the directional antenna apparatus, and a base station used for the system.

According to the invention according to claim 1, there is provided a mobile communication system comprising: a plurality of antenna elements which transmit and receive a radio signal to and from a mobile station; weighting means for weighting the amplitude and phase of the transmission or reception signal of each of the individual antenna elements; adding means for adding the reception signals from the individual antenna elements weighted by the weighting means and outputting the resulting signal to a reception unit; dividing means for dividing a transmission signal from a transmission unit to the weighting means corresponds to the individual antenna elements; storage means for storing weighting coefficients suitable for communication with the mobile station for each of a plurality of moving positions of the mobile station; and control means for setting the weighting coefficients stored in the storage means in the weighting means each timing the mobile station moves to each of the moving positions.

With the present invention, a base station senses the direction of a mobile station, while the mobile station is moving, need not do calculations to point the directivity to the direction of the mobile station, and causes the directivity to track the mobile station reliably even when the mobile station moves fast.

Consequently, it is possible to provide a mobile communication system which enables reliable radio communication constantly between a base station and a mobile station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows an example of the layout of a reference table provided in the directional antenna apparatus of the first embodiment;

FIG. 9 shows an example of the layout of a reference table provided in the directional antenna apparatus of the second embodiment;

FIG. 12 shows an example of the layout of a reference table provided in the directional antenna apparatus of the third embodiment.

DETAILED DESCRIPTION OF THE INVENTION

Referring to the accompanying drawings, embodiments of the present invention will be explained.

First Embodiment

Figure 1:
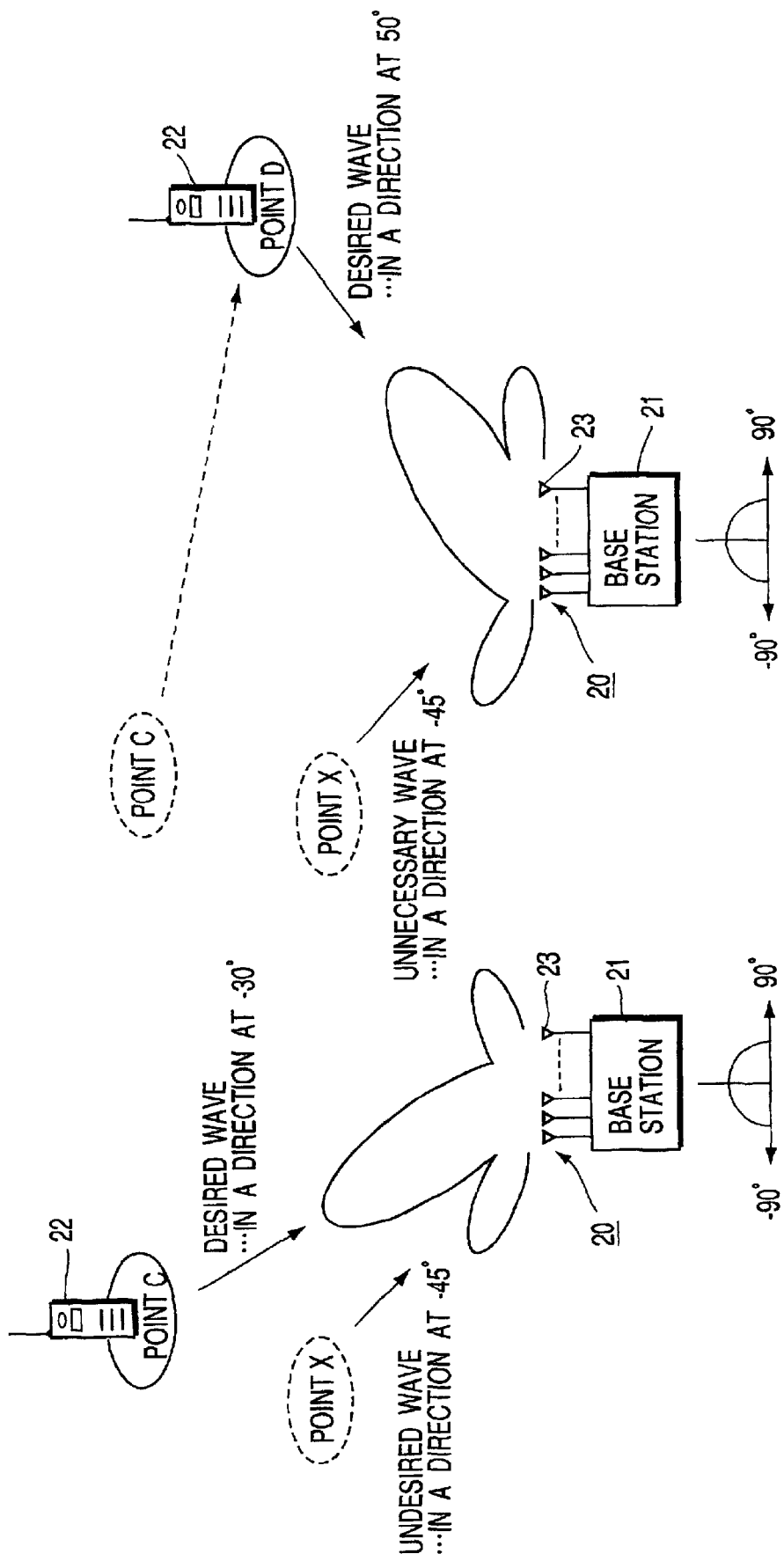
FIGS. 1A and 1B show the configuration of a mobile communication system according to a first embodiment of the present invention.

FIG. 1 shows the configuration of a mobile communication system composed of a base station 21 including a directional antenna apparatus 20 using an array antenna and a mobile station 22 with which the base station 21 communicates by radio. The array antenna, which includes a plurality of antenna elements 23, adjusts amplitude and phase by setting coefficients for the received signals receiving the individual antenna elements 23 or the send signals outputted from the individual antenna elements 23 and thereby forms a specific directivity.

FIG. 1A shows a situation where the mobile station 22 at point C, the move starting position, located at −30° from the base station 21 is communicating with the base station 21 by radio. At the same time, undesired waves, including interference waves and interruption waves, are being emitted from point X located at −45° from the base station 21. At this time, the base station 21 forms the desired directivity by means of the individual antenna elements 23 so that the directivity may turn toward the mobile station 22 at point C and a null point turn to the undesired waves.

FIG. 1B shows a situation where the mobile station 22 has moved from point C to point D, the move end position, located at 50° from the base station 21. When the mobile station 22 has moved to point D, the base station 21 forms the desired directivity by means of the individual antenna elements 23 so that the directivity may turn toward the mobile station 22 at point D and at a null point turn to the undesired waves.

Then, while the mobile station 22 is moving from point C, the move starting position, to point D, the move end position, the base station 21 forms the desired directivity by means of the individual antenna elements 23 according to the moving speed of the mobile station 22 and performs radio communication, while tracking the mobile station 22. The mobile station 22 is, for example, a portable wireless terminal or a wireless tag.

Figure 2:
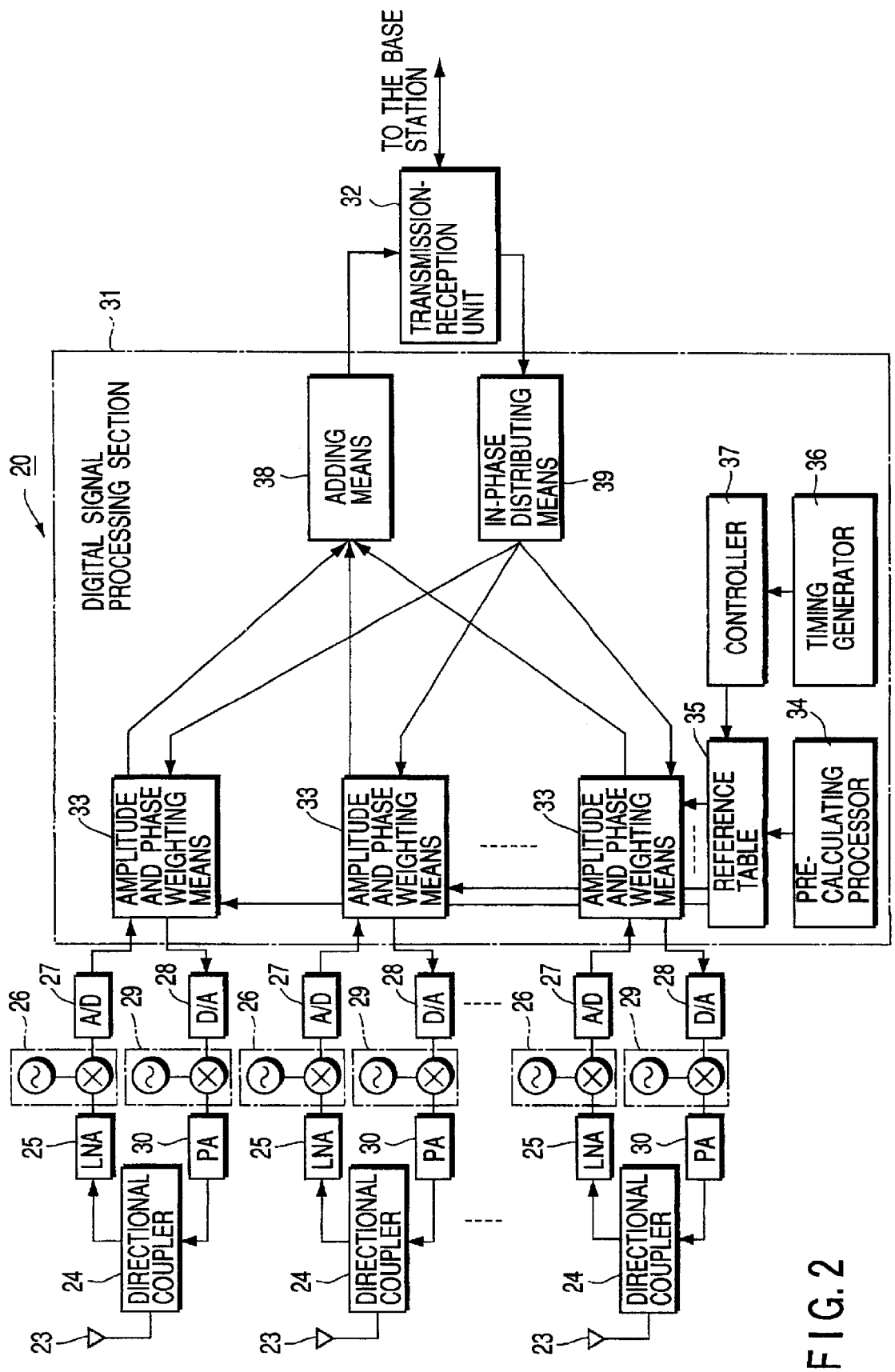
FIG. 2 is a block diagram showing the configuration of a directional antenna apparatus provided in a base station of the first embodiment.

As shown in FIG. 2, in the directional antenna apparatus 20 of the base station 21, a plurality of directional coupler 24 are provided so as to correspond to the individual antenna elements 23, a plurality of low-noise amplifiers 25, a plurality of first frequency conversion unit 26, and a plurality of A/D converters 27 are provided as a reception system, a plurality of D/A converters 28, a plurality of second frequency converters 29, and a plurality of power amplifiers 30 are provided as a transmission system, and further a digital signal processing unit 31 for weighting the amplitude and phase of the transmission or reception signal using weighting coefficients and a transmission-reception unit 32 for exchanging transmission and reception data with the base station are provided.

In the directional antenna apparatus 20, when the individual antenna elements 23 have received the radiowave, each received signal is supplied via the corresponding multiplexer section 24 to the corresponding low-noise amplifier 25, which amplifies the signal. Then, each received signal is frequency-converted by the corresponding first frequency converter 26. The frequency-converted signal is converted by the A/D converter 27 into a digital signal, which is then supplied to the digital signal processing unit 31.

The digital signal processing unit 31 includes a plurality of amplitude-and-phase-weighting means 33 corresponding to the individual antenna elements 23, a pre-calculation processor 34 for, when a plurality of directions are set between the direction of the move starting position and the direction of the move end position (the destination), pre-calculating the weighting coefficients for the optimum amplitude and phase to communicate with the mobile station 22 in each of the set plurality of directions, a reference table 35 acting as storage means for storing the amplitude and phase weighting coefficients calculated by the pre-calculation processor 34, a timing generator 36 for determining the timing of reading the weighting coefficients suitable for the direction of the mobile station 22 from the reference table 35 sequentially in accordance to the movement of the mobile station 22, control means 37 for reading the weighting coefficients from the reference table 35 and setting them in each of the weighting means 33 with the timing determined by the timing generator 36, adding means 38 for adding the received signals weighted by the individual weighting means 33 and outputting the result to the transmission-reception unit 32, and an in-phase dividing means 39 for in-phase-dividing the transmission signal from the transmission-reception unit 32 into a plurality of transmission signals corresponding to the individual antenna elements 23 and supplying the divided signals to the corresponding weighting means 33.

Then, each weighting means 33 weights the digital signal (reception signal) from the corresponding A/D converter 27 using the corresponding amplitude and phase weighting coefficients stored in the reference table 35. These weighted digital signals are added at the adding means 38, and supplied to the transmission-reception unit 32. At this time, the timing generator 36 determines the timing of reading the weighting coefficients from the reference table 35 in accordance to the moving speed of the mobile station 22. With this timing, the controller 37 updates the weighting coefficients read from the reference table 35 and sets the updated coefficients in the weighting means 33.

After the transmission-reception unit 32 outputs the transmission signal, the in-phase dividing means 39 in-phase divides the transmission signal to the individual antenna elements 23 and supplies the divided signals to the corresponding weighting means 33. Each weighting means 33 weights the corresponding transmission signal using the amplitude and phase weighting coefficients stored in the reference table 35.

After each weighted transmission signal is converted by the corresponding D/A converter 28 into an analog signal, the analog signal is frequency-converted by the corresponding second frequency converter 29. The frequency-converted signal is amplified by the power amplifier 30. The power-amplified signal is supplied via the corresponding directional coupler 24 to the corresponding antenna element 23.

FIG. 3 shows an example of the reference table 35 that stores the weighting coefficients used when the mobile station 22 moves from point C to point D.

The distance from point C with the desired wave in a direction at −30° against undesired waves in a direction at −45° to point D with the desired wave in a direction at 50° is divided into step 0 to step 80. In each step, the amplitude and phase weighting coefficients to be given to each of an N number of antenna elements 23 are set.

Specifically, in step 0, the amplitude and phase weighting coefficients are stored which point directivity toward point C, the move starting position, and form a null point that prevents directivity from turning toward undesired waves at point X. In step 80, the amplitude and phase weighting coefficients are stored which point directivity toward point D, the move end position, and form a null point that prevents directivity from turning toward undesired waves at point X.

Furthermore, an angle of 80° from point C, the move starting position, in a direction at −30° to point D, the move end position, in a direction at 50° is divided at intervals of an angle of 1°. The direction of each divided angle is set as the direction of the desired wave. In step 1 to step 79, the amplitude and phase weighting coefficients are stored which point directivity in a direction at each angle and form a null point in the direction of undesired waves at point X. These weighting coefficients are calculated at the pre-calculation processor 34 by simulation using, for example, an MSN algorithm, on the basis of information about the direction of the desired wave and the direction of undesired waves.

The timing generator 36 calculates the time when the mobile station 22 arrives at the position corresponding to the direction at each angle from the distance between base station 21 and point C, between base station 21 and point D, and between point C and point D, and the moving speed of the mobile station 22. The controller 37 counts the time since the mobile station 22 started to move from point C and, when the arrival time calculated by the timing generator 36 has been arrived at, reads the relevant amplitude and phase weighting coefficients from the reference table 35 and supplies these to the corresponding weighting means 33, thereby weighting the individual antenna elements 23.

Figure 4:
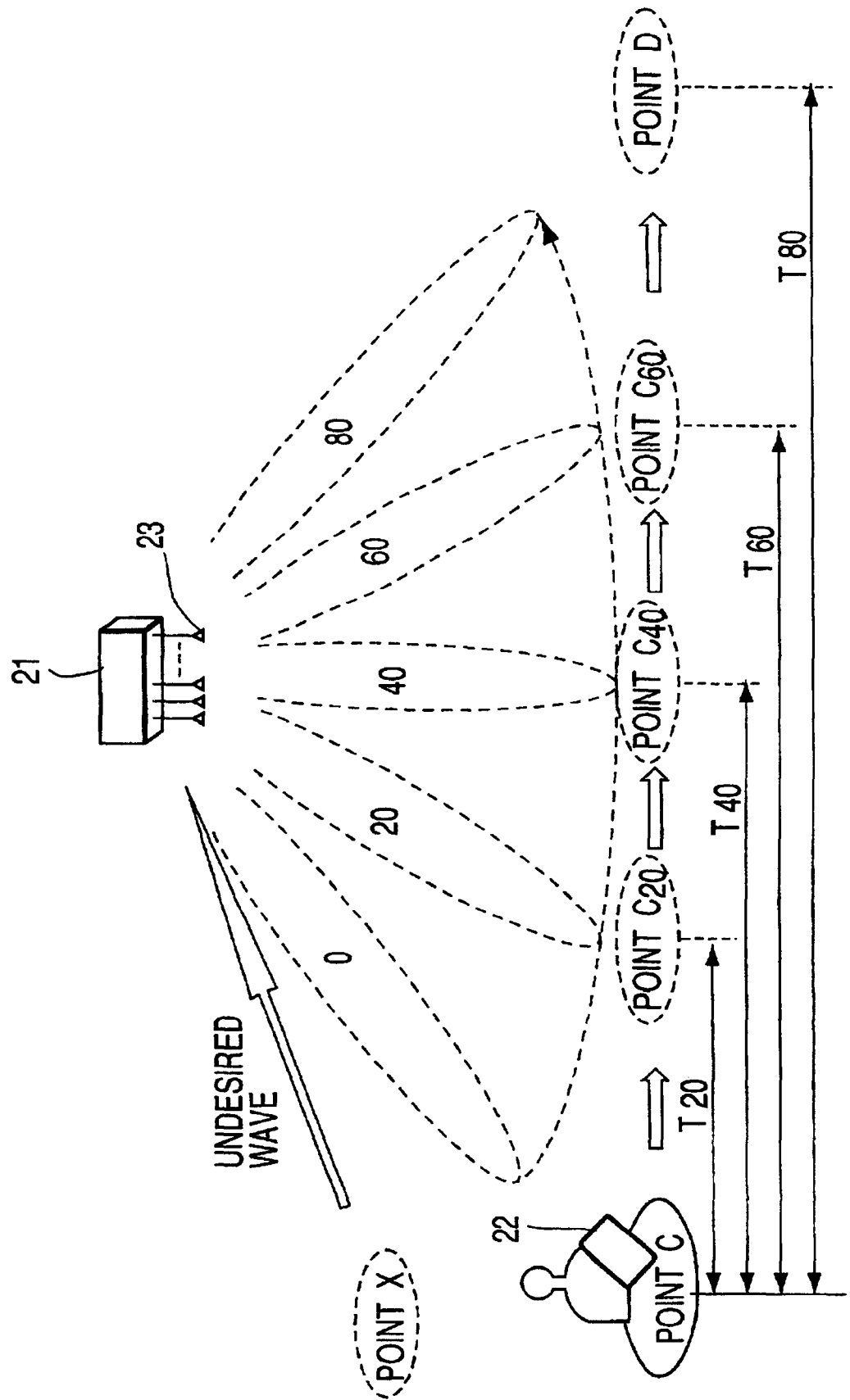
FIG. 4 is a diagram to help explain an example of the timing of changing the weight coefficients of the directional antenna apparatus in the first embodiment.

For example, as shown in FIG. 4, time $T_n$ when the mobile station arrives at point $C_n$ (where n=1 to 79) can be calculated in advance as follows: the time when the mobile station 22 at point C will arrive at point $C_{20}$ where it will be in the direction of the desired wave in step 20 is $T_{20}$ seconds later, the time when the mobile station 22 will arrive at point $C_{40}$ where it will be in the direction of the desired wave in step 40 is $T_{40}$ seconds later, the time when the mobile station 22 will arrives at point $C_{60}$ where it will be in the direction of the desired wave in step 60 is $T_{60}$ seconds later, and the time when the mobile station 22 will arrive at point $C_{80}$ where it will be in the direction of the desired wave in step 80 is $T_{80}$ seconds later. Then, after the mobile station 22 starts to move from point C, the controller 37, at time $T_n$ when the mobile station 22 arrives at point $C_n$, reads the amplitude and phase weighting coefficients for each antenna element 23 stored in step 1 to step 79 in the reference table 35 and sets them in the individual antenna elements 23. This enables the directivity of the antenna to be switched so as to track the mobile station 22, while the mobile station 22 is moving from the move starting point to the move end point.

Furthermore, the updating angle interval of the weighting coefficients may be made shorter when the moving speed of the mobile station 22 is low, and made longer when the moving speed is high, thereby dealing with different moving speeds of the mobile station 22.

Figure 5:
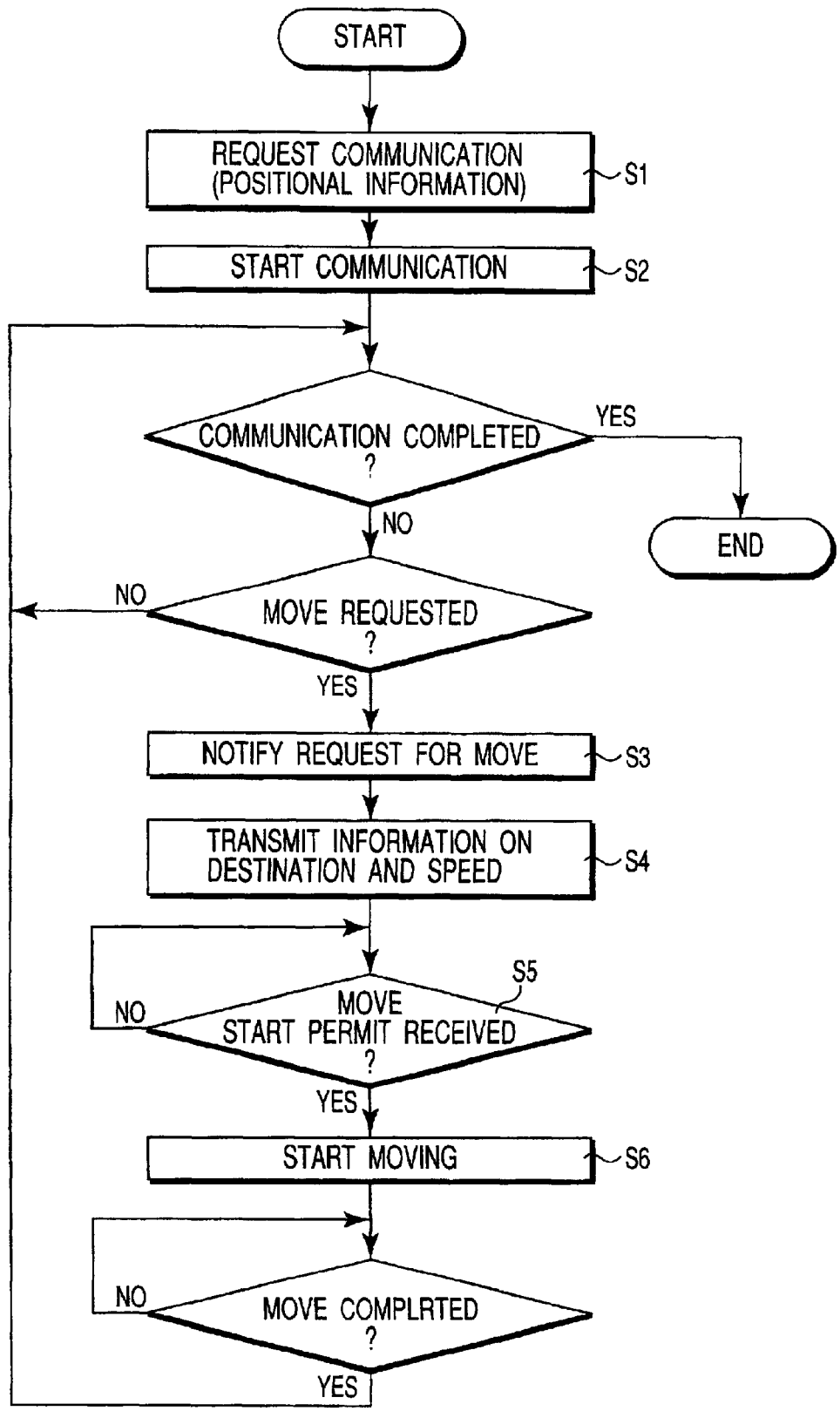
FIG. 5 is a flowchart for the operation of a mobile station in the first embodiment.
Figure 6:
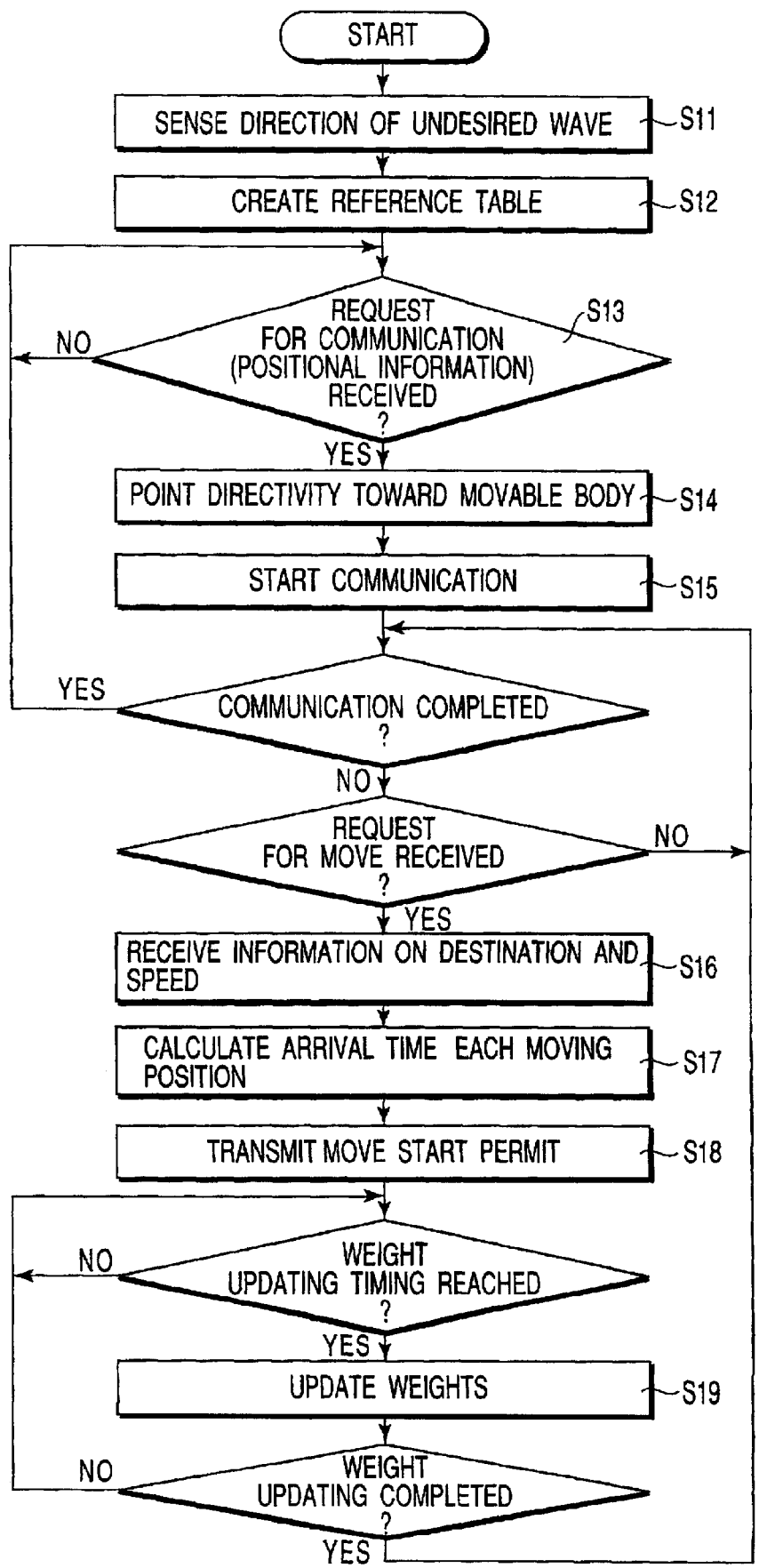
FIG. 6 is a flowchart for the operation of the directional antenna apparatus in the first embodiment.

FIG. 5 is a flowchart for the operation of the mobile station 22. FIG. 6 is a flowchart for the operation of the directional antenna apparatus 20 of the base station 21.

The mobile station 22 transmits a request for communication including information about the position of its own station at S1 and starts communication at S2.

When ending the communication without moving, the mobile station 22 completes the communication at it is. When wanting communication while moving, the mobile station 22 informs the base station 21 of a request for move at S3 and transmits information about the destination and the moving speed.

Thereafter, when receiving a move start permit from the base station 21 at S5, the mobile station 22 starts moving at S6. Then, when having arrived at the destination and made sure of the completion of the move at S7, the mobile station 22 continues the operation until the communication has finished.

At S11, the base station 21 first senses the direction of undesired waves. If the direction of undesired waves is known beforehand, it may be inputted manually. Undesired wave may not exist.

Then, at S12, the reference table 35 is created. Specifically, the pre-calculation processor 34 calculates the optimum amplitude weighting coefficient and optimum phase weighting coefficient for the direction of the desired wave and creates the reference table 35.

In this state, the base station is waiting to receive a request for communication from the mobile station 22 at S13. When receiving a request for communication, the base station 21 reads the corresponding weighting coefficients from the reference table 35, sets them in the weighting means 33, and points the directivity of each antenna element 23 toward the mobile station 22 at S14. Then, at S15, the base station 21 starts to communicate with the mobile station 22.

Then, when the mobile station 22 ends communication without moving, the base station 21 completes the communication as it is and waits for another request for communication from the mobile station. When the base station 21 is given notice of a request for move by the mobile station 22, it receives information about the destination and the moving speed from the mobile station 22 at S16, calculates the time when the mobile station 22 arrives at the position corresponding to the direction at each angle from the base station 21 at S17, and transmits a move start permit to the mobile station 22 at S18.

Then, the timing generator 36 calculates the time when the mobile station 22 arrives at the position corresponding to the direction at each angle from the base station 21. When the time when the mobile station 22 arrives at the position corresponding to the direction at each angle has been arrived at, the controller 37 updates the optimum amplitude and phase weighting coefficients read from the reference table 35 at S19. Then, the controller 37 continues updating the weighting coefficients for the direction at each angle one by one until the mobile station 22 has arrived at the move end position and communicates with the mobile station, while tracking the mobile station.

When the mobile station 22 has arrived at the move end position, the base station 21 continues communication, with the amplitude and phase weighting coefficients fixed. After ending the communication, the base station waits for another request for communication from the mobile station.

There is no need at all for the base station 21 to estimate the direction of the mobile station on the basis of the received signal from the mobile station 22, while the mobile station is moving, or to do calculations to point directivity toward the mobile station. Consequently, even when the moving speed of the mobile station is high, the base station 21 can cause the directivity to track the mobile station reliably, which constantly assures stable radio communication with the mobile station.

In the first embodiment, the timing generator 36 calculates the arrival time of the mobile station 22 for each of step 1 to step 80 in advance. Then, the controller 37 updates the weighting coefficients read from the reference table 35 each time it counts each arrival time calculated by the timing generator 36. The present invention is not limited to this.

For instance, the timing generator 36 calculates a moving time (T seconds) and obtains T/n seconds by dividing T seconds into n (n is an integer) equal parts. The controller 37 calculates the positions at which the mobile station 22 arrives at intervals of T/n seconds and selects the step in the direction of the desired wave corresponding to the position at which the mobile station arrives at intervals of T/n seconds in the range from step 1 to step 79 in the reference table 35. The controller 37 may read the amplitude and phase weighting coefficients of the selected step from the reference table 35 and set them in the weighting means 33.

Figure 7:
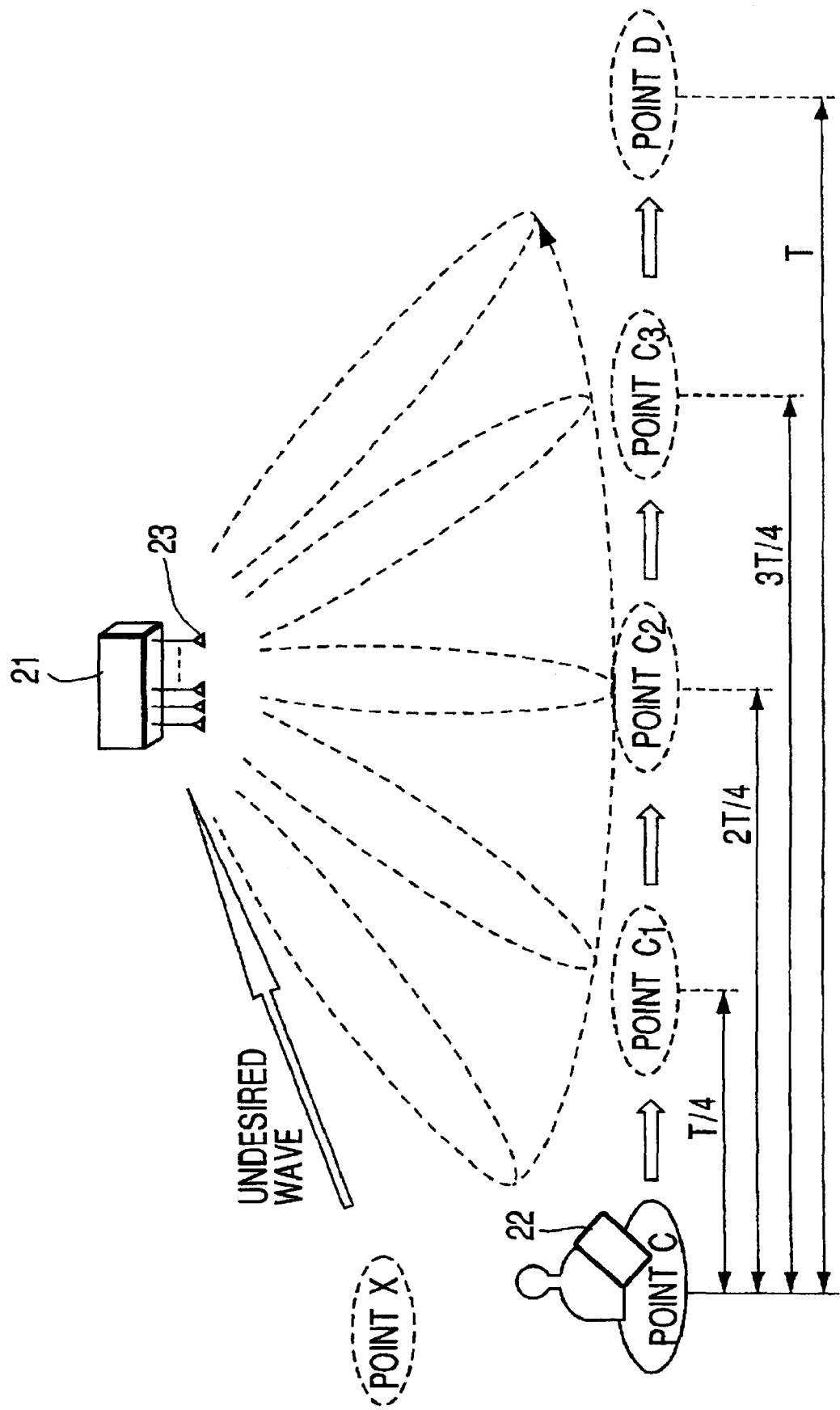
FIG. 7 is a diagram to help explain another example of the timing of changing the weight coefficients of the directional antenna apparatus in the first embodiment.
Figure 8:
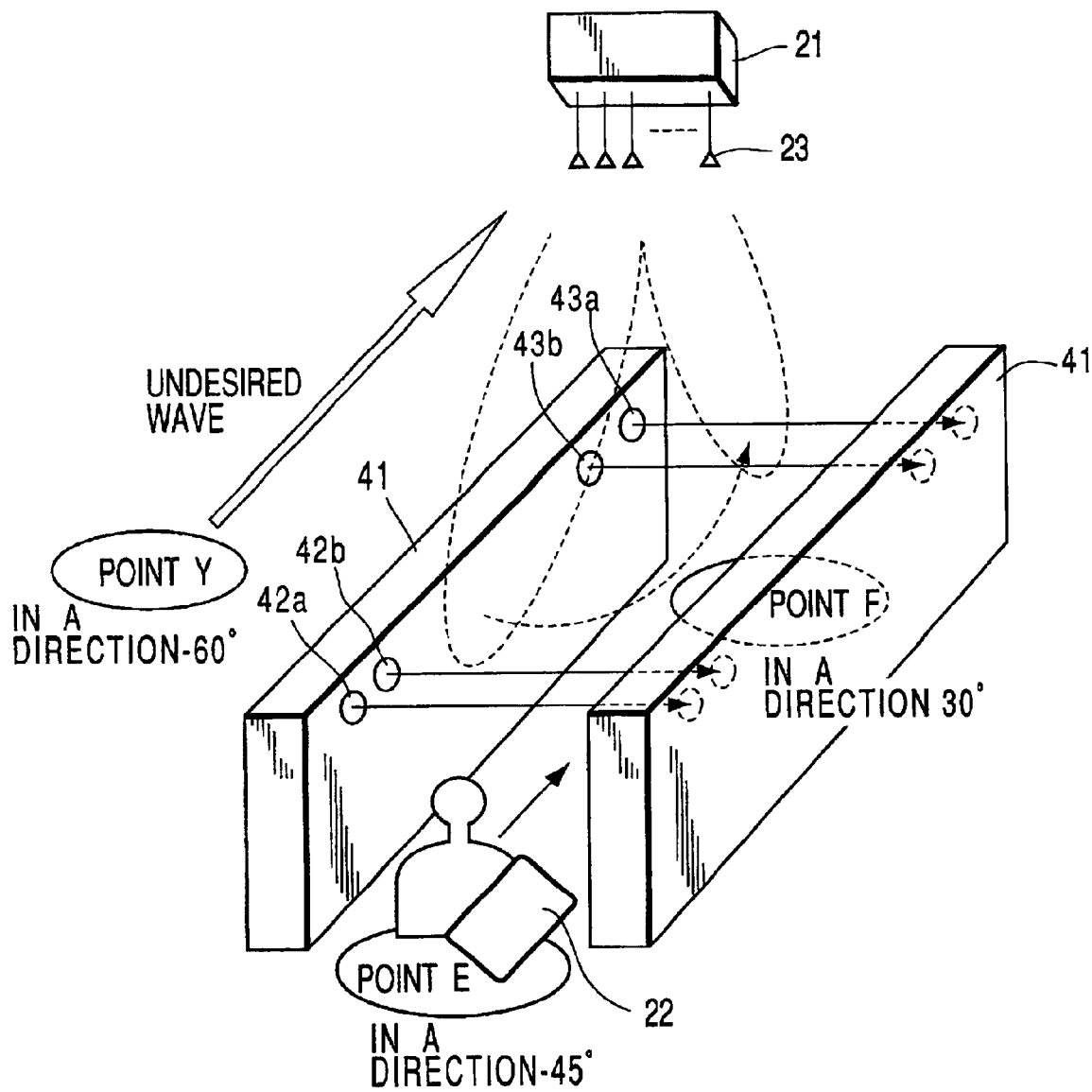
FIG. 8 shows the configuration of a mobile communication system according to a second embodiment of the present invention.

FIG. 7 shows a case where the mobile station 22 at point C arrives at point $C_1$ T/4 seconds later, point $C_2$2T/4 seconds later, and point $C_3$3T/4 seconds later. In this case, since the moving position of the mobile station 22 is calculated at intervals of T/4 seconds, the direction of the desired wave in the step corresponding to the moving position of the mobile station 22 is determined. The controller 37 reads from the reference table 35 the optimum weighting coefficients stored in the step corresponding to the position at which the mobile station 22 arrives in T/4 seconds at intervals of T/4 seconds calculated by the timing generator 36 and sets them in the weighting means 33, thereby pointing the directivity of the antenna toward the mobile station.

With this approach, the number of steps stored in the reference table 35 is increased and T/n-second intervals calculated by the timing generator 36 are adjusted, which makes it possible to adjust the timing of updating the weighting coefficients read from the reference table on the basis of the tracking accuracy of the mobile station 22, the moving speed of the mobile station 22, the processing speed of the base station 21, and others.

Second Embodiment

A second embodiment of the present invention relates to a case where a mobile communication system is applied to an automatic ticket gate or a gate passage watch. The configuration of a base station is the same as that in the first embodiment. On both sides of a gate 41, a pair of gate sensors 42*a*, 42*b* and a pair of gate sensors 43*a*, 43*b* are arranged at a specific distance apart in the direction for which the mobile station 22 moves. They are used as sensor means for monitoring the approach, moving speed, and direction of move of the mobile station 22. The gate sensors 42*a*, 42*b*, 43*a*, 43*b*, which are sensors composed of, for example, light-emitting elements and light-detecting elements, are designed to obtain information about the moving speed and the direction of move, when the mobile station 22 passes between the gate sensors 42*a* and 42*b*, or between the gate sensors 43*a* and 43*b*. The information about the approach, moving speed, and direction of move of the mobile station 22 sensed by these gate sensors 42*a*, 42*b*, 43*a*, 43*b* is transmitted to a base station 21.

When viewed from the base station 21, point E in the direction of the desired wave is in a direction at −45° and point F is in a direction at 30°. The directions of arrival of undesired waves at point Y is in a direction at −60°. As shown in FIG. 9, the base station 21 has a reference table 351*a* that stores the optimum weighting coefficients to be given to a directional antenna apparatus 20 when the mobile station 22 moves from point E to point F and a reference table 351*b* that stores the optimum weighting coefficients to be given to the directional antenna apparatus 20 when the mobile station 22 moves from point F to point E.

Specifically, in the reference table 351*a*, point E is set as step 0 and point F as step 15, and the direction between step 0 and step 15 is set to a resolution angle of 5 . That is, when viewed from the base station 21, point E, which means step 0 in the reference table 351*a*, is that the desired wave is in a direction at −45° and undesired wave is in a direction at −60°, and step 1 in the reference table 351*a* is that the desired wave is in a direction at −40° and undesired wave is in a direction at −60°, and point F, which means step 15 in the reference table 351*a*, is that the desired wave is in a direction at 30° and undesired wave is in a direction at −60°. For each point in step 0 to step 15, the optimum amplitude weighting coefficient and optimum phase weighting coefficient are stored which cause directivity to point toward the each point and form a null point that prevents directivity from pointing toward the undesired wave at point Y.

Furthermore, in the reference table 351*b*, point F is set as step 0 and point E as step 15, and the direction between step 0 and step 15 is set to a resolution angle of 5°. That is, when viewed from the base station 21, point F, which means step 0 in the reference table 351*b*, is that the desired wave is in a direction at 30° and undesired wave is in a direction at −60°, and step 1 in the reference table 351*b* is that the desired wave is in a direction at 25° and undesired wave is in a direction at −60°, and point E, which means step 15 in the reference table 351*b*, is that the desired wave is in a direction at −45° and undesired wave is in a direction at −60°. For each point in step 0 to step 15, the optimum amplitude weighting coefficient and optimum phase weighting coefficient are stored which cause directivity to point toward the point and form a null point that prevents directivity from pointing toward the undesired wave at point Y.

Figure 10:
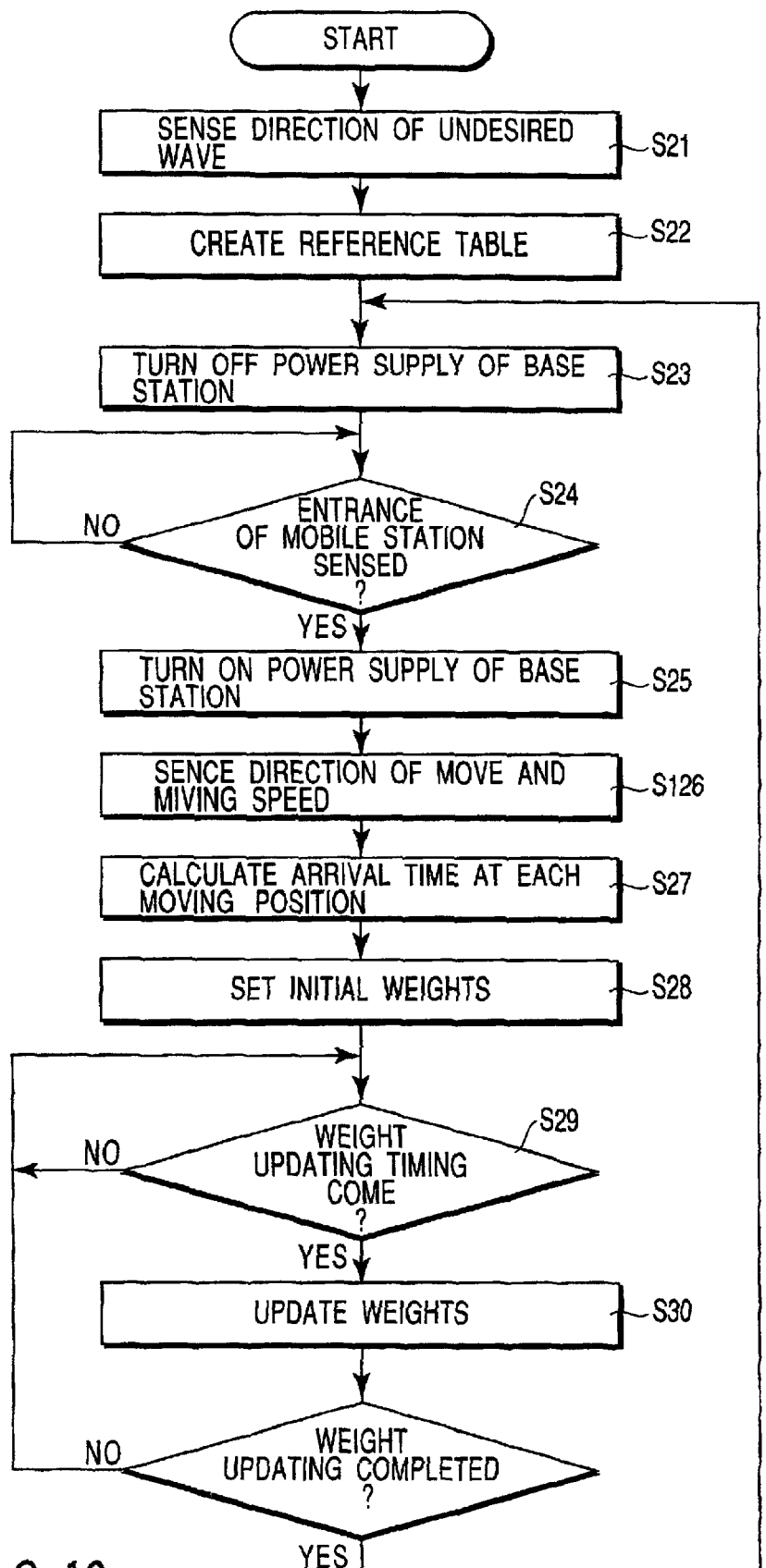
FIG. 10 is a flowchart for the operation of the directional antenna apparatus in the second embodiment.
Figure 11:
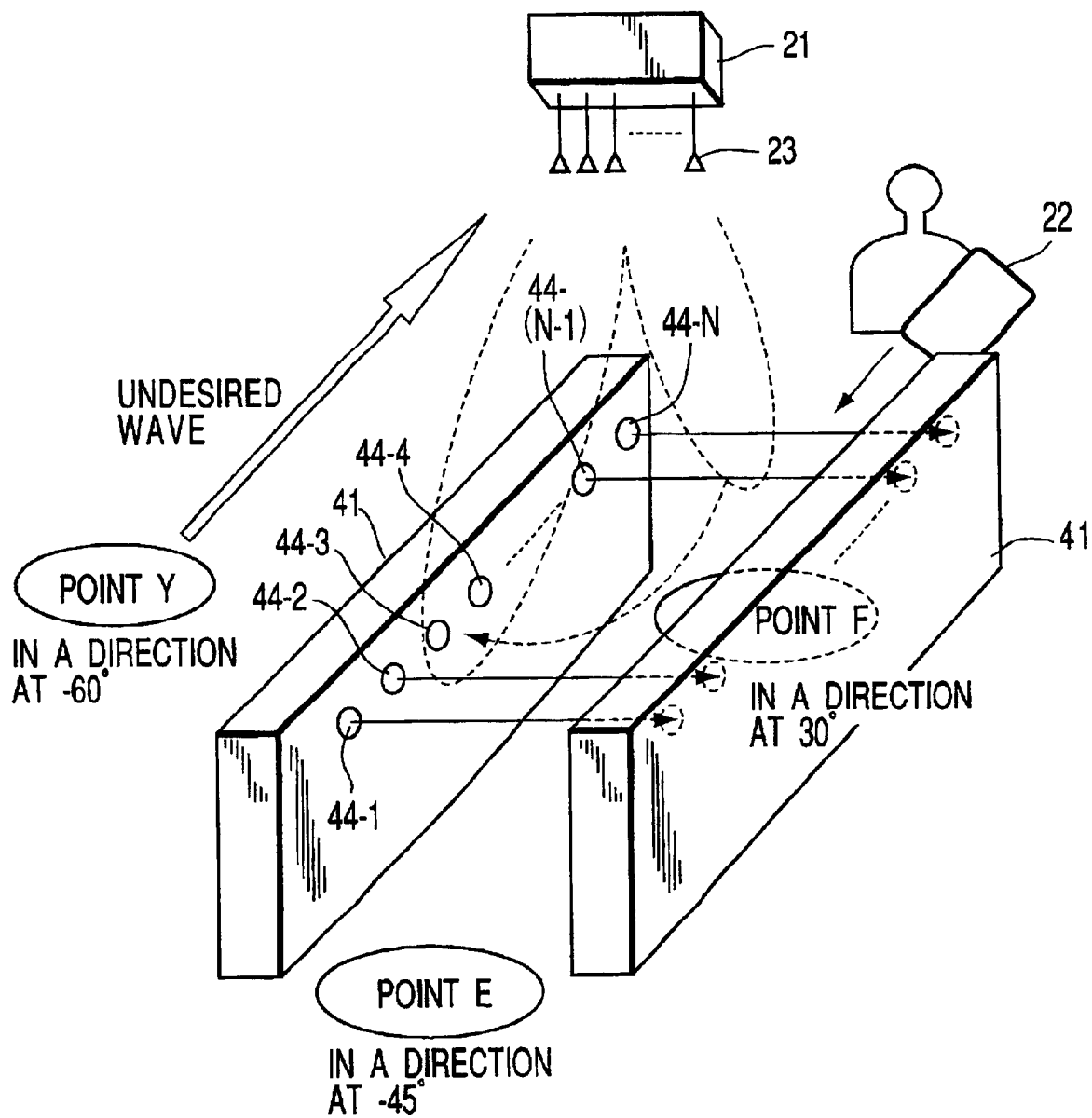
FIG. 11 shows the configuration of a mobile communication system according to a third embodiment of the present invention.
Figure 13:
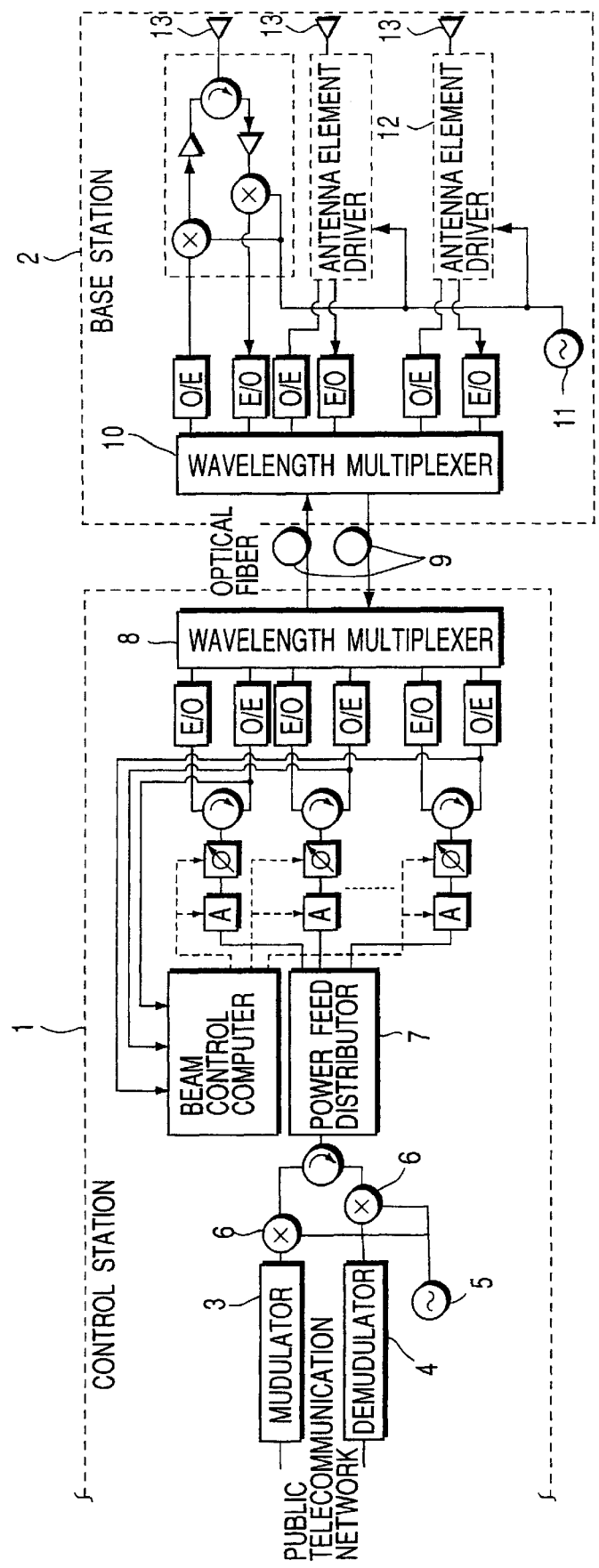
FIG. 13 is a block diagram of a conventional antenna apparatus.

The directional antenna apparatus 20 of the base station 21 operates as shown in FIG. 10. First, at S21, the direction of undesired waves is sensed. If the direction of undesired waves is known beforehand, it may be inputted manually. The undesired waves may not exist.

Then, at S22, the reference tables 351*a*, 351*b* are created. Specifically, the pre-calculation processor 34 calculates the optimum amplitude weighting coefficient and optimum phase weighting coefficient for the direction of point E, the move starting point, the direction of point F, the move end point, and a plurality of directions shifted at intervals of a resolution angle of 5° between point E and point F. Then, the pre-calculation processor 34 stores the calculated weighting coefficients and creates the reference tables 351a and 351b.

In this state, when communication is not performed, the power supply is made down at S23. Then, at S24, if the mobile station 22 has entered the gate 41 is sensed using the signals from the gate sensors 42a, 42b or gate sensors 43a, 43b. At S25, the power supply is turned on. This helps suppress the power consumption in the base station 21.

Then, at S26, the direction of move and moving speed of the mobile station 22 are sensed using the signals from the gate sensors 42a, 42b or gate sensors 43a, 43b.

When the signal is received from the gate sensor 42b after the signal from the gate sensor 42a was received, it is sensed that the mobile station 22 comes in from point E and moves toward point F. In addition, from the time passed from when the signal was received from the gate sensor 42a until the signal is received from the gate sensor 42b, the moving speed of the mobile station 22 is sensed.

Conversely, when the signal is received from the gate sensor 43b after the signal was received from the gate sensor 43a, if the mobile station 22 comes in from point F and moves toward point E is sensed. Moreover, from the time passed from when the signal was received from the gate sensor 43a until the signal is received from the gate sensor 43b, the moving speed of the mobile station 22 is sensed.

Then, at S27, arrival time at each moving position is calculated. Specifically, when the mobile station 22 moves from point E to point F, the timing generator 36 calculates the time when the mobile station 22 arrives at the position corresponding to each direction in step 0 to step 15 in the reference table 351a.

Then, at S28, the controller 37 weights the initial weighting coefficients. In a case where the mobile station 22 moves from point E to point F, when the gate sensors 42a, 42b have sensed the mobile station 22 coming in, the controller 37 reads the optimum amplitude weighting coefficient and optimum phase weighting coefficient in step 0, point E, from the reference table 351a and sets these weighting coefficients in the weighting means 33. This enables the directional pattern formed by the individual antenna elements 23 to have a high directivity in a direction at −45° and a null point formed in a direction at −60°. The controller 37 starts to count the time.

Thereafter, at S27, the controller 37 compares the time calculated by the timing generator 30 with the counted time. When the counted time has come the time when the mobile station 22 arrives at the position corresponding to the direction in step 1, the controller 37, at S30, reads the optimum amplitude weighting coefficient and optimum phase weighting coefficient in step 1 from the reference table 351a and sets these weighting coefficients in the weighting means 33. That is, the controller 37 updates the weighting coefficients.

From this time on, each time the time when the mobile station 22 arrives at the position corresponding to the direction in each of steps 2, 3, . . . , the controller 37 updates the weighting coefficients read from the reference table 351a. At step 15, that is, when the mobile station 22 has arrived at point F, the controller 37 reads the optimum amplitude weighting coefficient and optimum phase weighting coefficient in step 15 from the reference table 351a and sets these weighting coefficients in the weighting means 33. After the communication is completed, at S23, the controller 37 makes the power supply of the base station 21 down at S23, and at S24, waits for another approach of the mobile station 22.

In addition, when the mobile station 22 moves from point F to point E, the controller 37 reads the optimum amplitude weighting coefficient and optimum phase weighting coefficient from the reference table 351b.

The base station 22 can cause directivity to track the mobile station 22 passing through the gate 41 reliably, even if the mobile station 22 is moving fast, which constantly assures stable radio communication between the base station 21 and mobile station 22.

Third Embodiment

A third embodiment of the present invention relates to a case where a mobile communication system is applied to an automatic ticket gate or a gate passage watch. The configuration of a base station is the same as that in the second embodiment.

In a gate 41, an N number of gate sensors 41-1, 44-2, 44-3, 44-4, . . . , 44-(N-1), 44-N are arranged as sensor means at intervals of a specific distance.

Let the positions in which the individual gate sensors 44-1 to 44-N are arranged be the moving positions $P_1, P_2, P_3, \ldots, P_{N-1}, P_N$. The individual gate sensors 44-1 to 44-N, which are composed of, for example, light-emitting elements and light-detecting elements, sense the position of the mobile station 22 passing through the gate 41 and informs the base station 21 of the position.

AS shown in FIG. 12, the base station 21 has reference tables 352a and 352b which store the optimum amplitude weighting coefficients and optimum phase weighting coefficients that enable a directional antenna apparatus 20 to form such a directional pattern as has directivity in the direction of each of the moving points $P_1, P_2, P_3, \ldots, P_{N-1}, P_N$ and forms a null point in the direction of undesired waves at point Y. The reference table 352a corresponds to a case where the mobile station 22 moves from point E to point F. The reference table 352b corresponds to a case where the mobile station 22 moves from point E to point F. Point E corresponds to the moving position $P_1$ and point F corresponds to the moving point $P_N$.

The directional antenna apparatus 20 of the base station 21 first senses the direction of undesired waves and then creates the reference tables 352a, 352b. The pre-calculation processor 34 calculates the optimum amplitude weighting coefficient and optimum phase weighting coefficient for the direction of each of the moving positions $P_1$ to $P_N$ and stores the weighting coefficients in the reference tables 352a, 352b.

When communication is not performed, the power supply is made down. In this state, if the mobile station 22 has entered the gate 41 is sensed using the signal from the gate sensor 44-1 or gate sensor 44-N, the power supply is turned on.

For instance, when the signal is first received from the gate sensor 44-1, it is sensed that the mobile station 22 has come in from point E. Then, the optimum amplitude weighting coefficient and optimum phase weighting coefficient corresponding to the moving position $P_1$ are read from the reference table 352a and set in the weighting means 33. This enables the directional pattern formed by the individual antenna elements 23 to have a high directivity in a direction at −45° and a null point formed in a direction at −60°.

Then, when the signal is received from the gate sensor 44-2, the optimum amplitude weighting coefficient and optimum phase weighting coefficient corresponding to the moving position $P_2$ are read from the reference table 352a and set in the weighting means 33. Next, when the signal is received from the gate sensor 44-3, the optimum amplitude weighting coefficient and optimum phase weighting coefficient corresponding to the moving position $P_3$ are read from the reference table 352*a* and set in the weighting means 33.

In this way, each time the mobile station 22 moves further to each of the moving positions $P_4$ to $P_N$, the optimum amplitude weighting coefficient and optimum phase weighting coefficient corresponding to each moving position are read from the reference table 352*a* and set in the weighting means 33.

Conversely, when the signal is first received from the gate sensor 44-N, it is sensed that the mobile station 22 has come in from point F. Then, the optimum amplitude weighting coefficient and optimum phase weighting coefficient corresponding to the moving position $P_N$ are read from the reference table 352*b* and set in the weighting means 33. This enables the directional pattern formed by the individual antenna elements 23 to have a high directivity in a direction at 30° and a null point formed in a direction at −60°.

From this time on, each time the mobile station 22 moves further to each of the moving positions $P_{N-1}$ to $P_1$ the optimum amplitude weighting coefficient and optimum phase weighting coefficient corresponding to each moving position are read from the reference table 352*b* and set in the weighting means 33.

The base station can cause directivity to track the mobile station 22 passing through the gate 41 reliably, even if the mobile station 22 is moving fast, which constantly assures stable radio communication between the base station 21 and mobile station 22. Furthermore, directivity switching control is simple.

In addition, while in the above embodiments, the directional antenna apparatus 20 of the base station weights the amplitude and phase at the digital signal processing unit 31, the present invention is not limited to this. For instance, in reception, after the analog signals are weighted in amplitude and phase and added together, an A/D converter may convert the resulting signal into a digital received signal and supply the digital signal to the transmission-reception unit. In transmission, after the transmission-reception unit in-phase divided the digital transmission signal, a D/A converter may convert the divided signal into an analog signal, weight the analog signal in amplitude and phase, and output the weighted analog signal to each antenna element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A directional antenna apparatus comprising:
    a plurality of antenna elements which transmit and receive a radio signal to and from a mobile station;
    weighting means for weighting the amplitude and phase of the transmission or reception signal of each of the individual antenna elements;
    adding means for adding the reception signals from said individual antenna elements weighted by the weighting means and outputting the resulting signal to a reception unit;
    dividing means for dividing a transmission signal from a transmission unit to said weighting means corresponds to said individual antenna elements;
    storage means for storing weighting coefficients suitable for communication with the mobile station for each of a plurality of moving positions of said mobile station; and
    control means for setting the weighting coefficients stored in said storage means in said weighting means each timing said mobile station moves to each of the moving positions.

2. The directional antenna apparatus according to claim 1, wherein said mobile station is a portable wireless terminal.

3. The directional antenna apparatus according to claim 1, wherein said mobile station is a wireless tag.

4. A directional antenna apparatus comprising:
    a plurality of antenna elements which transmit and receive a radio signal to and from a mobile station;
    weighting means for weighting the amplitude and phase of the transmission or reception signal of each of the individual antenna elements;
    adding means for adding the reception signals from said individual antenna elements weighted by the weighting means and outputting the resulting signal to a reception unit;
    dividing means for dividing a transmission signal from a transmission unit to said weighting means corresponds to the individual antenna elements;
    storage means for storing weighting coefficients suitable for communication with the mobile station for each of a plurality of directions set between the direction of the move starting position and move end position of said mobile station;
    timing generating means for determining the timing with which the weighting coefficients suitable for the direction of the mobile station are read from said storage means sequentially as the mobile station moves from the move starting position to the move end position; and
    control means for reading the weighting coefficients for the corresponding direction of said mobile station from said storage means with the timing determined by the timing generating means and setting the weighting coefficients in said weighting means.

5. The directional antenna apparatus according to claim 4, wherein said timing generating means calculates, from the moving speed of the mobile station moving from the move starting position to move end position, the time when the mobile station arrives at each of a plurality of directions set between the direction of the move starting position and the direction of the move end position, and determining the timing.

6. The directional antenna apparatus according to claim 4, wherein said timing generating means calculates from the moving speed of the mobile station the time required for the mobile station to move from the move starting position to the move end position, sets a plurality of times within the calculated time, and determines the set times to be the timing of reading weighting coefficients from the storage means.

7. A mobile communication system using a directional antenna apparatus according to claim 4, comprising:
    a gate through which said mobile station passes; and
    sensor means which is provided at the end portions of the gate and which senses the approach of said mobile station to said gate and informs a base station of the approach, wherein
    said control means, in response to the notice signal from said sensor means, reads the weighting coefficients for the corresponding direction of said mobile station from said storage means with the timing determined by the timing generating means and sets the weighting coefficients in said weighting means.

8. A mobile communication system using a directional antenna apparatus according to claim 4, comprising:
   a plurality of sensor means for sensing said mobile station at different positions and informing a base station of the result of the sensing; wherein
       said storage means stores weighting coefficients suitable for communication with said mobile station for each of the positions in which said individual sensor means are placed; and
       said control means, in response to the notice from each of said individual sensor means, reads the weighting coefficients corresponding to the position in which the corresponding sensor means is placed from said storage means and sets the weighting coefficients in said weighting means.

9. A base station used in a mobile communication system comprising:
   a plurality of antenna elements which transmit and receive a radio signal to and from a mobile station;
   weighting means for weighting the amplitude and phase of the transmission or reception signal of each of the individual antenna elements;
   adding means for adding the reception signals of said individual antenna elements weighted by the weighting means and outputting the resulting signal to a reception unit;
   dividing means for dividing a transmission signal from a transmission unit to said weighting means corresponds to the individual antenna elements;
   storage means for storing weighting coefficients suitable for communication with the mobile station for each of a plurality of directions set between the direction of the move starting position and move end position of said mobile station;
   timing generating means for determining the timing with which the weighting coefficients suitable for the direction of the mobile station are read from said storage means sequentially as the mobile station moves from the move starting position to the move end position; and
   control means for reading the weighting coefficients for the corresponding direction of said mobile station from said storage means with the timing determined by the timing generating means and setting the weighting coefficients in said weighting means.

* * * * *